United States Patent [19]

Degenne

[11] 4,197,738
[45] Apr. 15, 1980

[54] THERMAL FLUXMETER OR HEAT FLOW METER

[75] Inventor: Michel Degenne, Clermont, France

[73] Assignee: Saint-Gobain Industries, Neuilly-sur-Seine, France

[21] Appl. No.: 923,167

[22] Filed: Jul. 10, 1978

[30] Foreign Application Priority Data

Jan. 2, 1978 [FR] France ............................. 78 0009

[51] Int. Cl.² .................... G01K 17/00; H01L 35/04
[52] U.S. Cl. ............................... 73/190 H; 136/225
[58] Field of Search .............. 73/190 H, DIG. 7; 29/573; 136/225

[56] References Cited

U.S. PATENT DOCUMENTS

| 3,194,071 | 7/1965 | Hager, Jr. | 73/DIG. 7 |
| 3,554,815 | 1/1971 | Osborn | 29/573 |
| 4,049,469 | 9/1977 | Kolomets et al. | 136/225 |
| 4,050,302 | 9/1977 | Haupin | 136/225 |

FOREIGN PATENT DOCUMENTS

2238252 7/1973 France.

Primary Examiner—Herbert Goldstein
Attorney, Agent, or Firm—John T. Synnestvedt; Kenneth P. Synnestvedt

[57] ABSTRACT

A thermal fluxmeter is disclosed, comprising a sensor or pick-up incorporating at least one interconnected series of thermocouples, the sensor comprising a board or plate-like element having metallic plating applied to both sides of the element and to the interior surface of the orifices, the plating being divided into local areas and being formed of different metals in different areas thereof to provide thermocouples having low temperature and high temperature junctures at opposite side faces of the sensing element, which junctures are interconnected by plating within the orifices.

10 Claims, 8 Drawing Figures

FIG_1
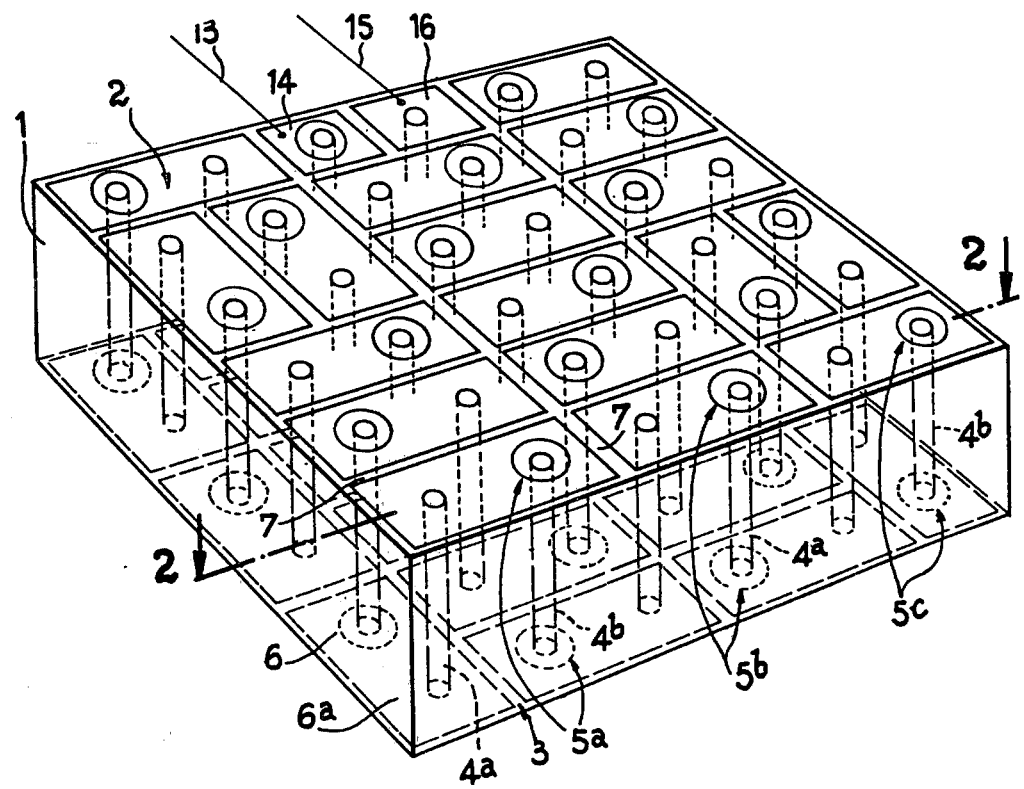
FIG_2
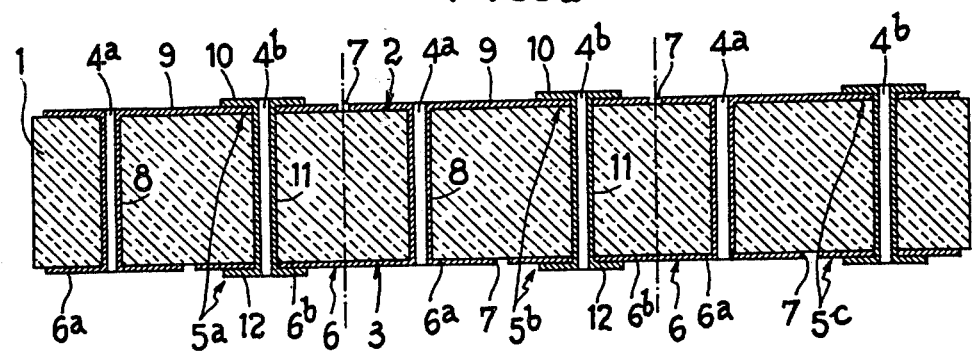

THERMAL FLUXMETER OR HEAT FLOW METER

BACKGROUND

The present invention generally relates to thermal metrology, and in particular, to the determination of the quantity of heat which passes through a wall per unit of time and surface.

It is particularly concerned with an apparatus for measuring thermal flux or heat transfer, i.e., a thermal fluxmeter or heat flowmeter or heat transfer meter, used for measuring thermal conductivity or resistance, for example of insulation materials or construction elements.

It is known that measuring certain thick and light fibrous insulating materials necessitates the use of measuring apparatus having a large measuring surface.

In order to carry out these measurements, several types of thermal fluxmeters have already been developed. One of these known fluxmeters contains a substratum of an electrical insulating material with a network of transverse orifices extended therethrough and several thermocouples serially connected. The hot and cold junctures of the thermocouples are placed respectively on opposite sides of the substratum while the respective conductors of each thermocouple extend through the substratum by way of the adjacent orifices, on the one hand to connect the hot and cold junctures to each other, and, on the other hand to serially connect the thermocouples. It is thus possible to distribute to the edges of this serial set-up an electrical voltage which is the sum of the electromotive forces generated by all the thermocouples and which is a function of the difference between the respective temperatures at opposite sides of the substratum.

In a manner well known per se, and by using the value of this voltage, the thermal flux passing through the fluxmeter can be determined.

In one known arrangement of a fluxmeter having the above construction, the conductors used for connecting each thermocouple and for connecting the thermocouples to each other are pieces of wire which must be manually inserted into the orifices of the substratum and then conveniently soldered to each other in places which are predetermined by small conducting plates secured in place by electroplating on the two sides of the substratum.

This prior fluxmeter has certain disadvantages as follows:

Manufacturing such a fluxmeter requires considerable manual fabrication, because of the fact that the pieces of wire must be inserted by hand and the solderings done one after another, likewise by hand. The time required for manufacturing is consequently longer as more thermocouples are added. In addition, the solderings on the small plates creates an overthickness condition which affects the evenness of the hot and cold sides, necessitating the pressing of the parts in a mold in order to finally obtain a fluxmeter with two flat and parallel sides. In addition, in the case where the wires are not fine enough, thermal bridges appear, and the thermal conductivity thus created distorts the results of the measurements to a certain extent.

OBJECTS

The objective of the invention is to overcome these disadvantages and more specifically to provide a fluxmeter capable of being fabricated by a method totally without repeated manual operations, the time for fabrication thus remaining independent of the number of junctures or connections per unit of surface.

The object of the invention is thus to provide a thermal fluxmeter of the type indicated hereinabove in which the hot and cold junctures of the thermocouples and the conductors which connect them are formed by metallic coatings respectively placed on opposite sides of the substratum and on the walls of the orifices in the substratum. It is thus possible to totally eliminate the wires as well as the solderings used in the fluxmeter of the prior technique, the thermoelectric junctures as well as the conductors capable of being embodied by way of plating (electroplating, application by chemical or other means) and photoengraving of the kind used, for example, in the manufacture of printed circuits.

The following advantages result:
the possibility of providing fluxmeters with large surface area and in various forms, a high rate of production, rapidity with good geometric and electrical reproducibility,
uniformity in the junctures,
the absence of any overthickness conditions on the sides of the substratum due to the fact of eliminating the solderings,
great sensitivity through increasing the density of the junctures, that is increasing the number of junctures per unit of surface area,
integration of the surface temperatures with the help of small metal plates forming the superficial conductors and the embodiment of two planes comprising the hot side and cold side of the substratum, these two planes presenting a better isothermicity.

BRIEF DESCRIPTION OF THE DRAWINGS

Other characteristics and advantages of the invention will appear in the course of the description which follows, given only by way of example and made while referring to the attached drawings in which:

FIG. 1 is a view in perspective of the sensing part or pickup of a fluxmeter according to the invention;

FIG. 2 is a sectional view shown along the line 2—2 of FIG. 1;

DETAILED DESCRIPTION

Figure 4:
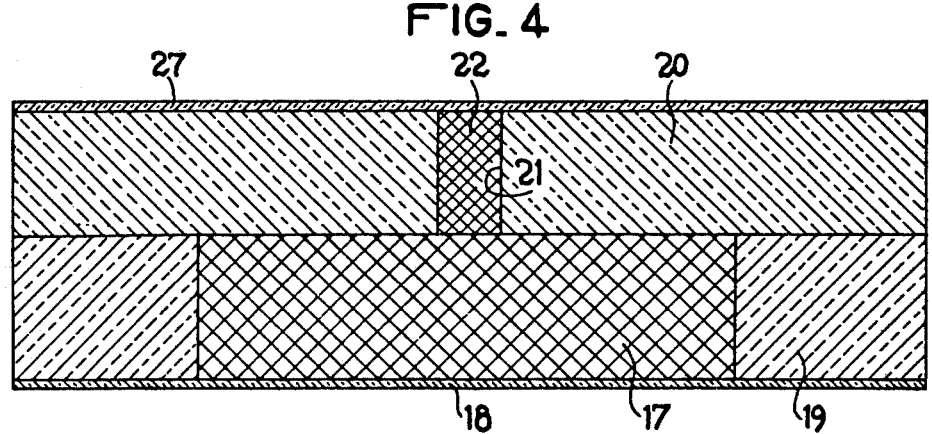
FIG. 4 is a transversal sectional view shown along the line 4—4 of FIG. 3.

According to the embodiment illustrated in FIGS. 1 and 2, the sensor or pickup of the fluxmeter according to the invention comprises a substratum 1 formed of an electrical insulating material such as a fiber glass reinforced epoxy (epoxy glass). This substratum may be a rigid or pliable plate and includes a network of transverse orifices perpendicularly oriented to the side face 2 and 3 of the substratum, this network being composed of a first series of orifices 4a and of a second series of orifices 4b alternating with the first series.

This network of orifices is connected to a certain number of thermocouples 5a, 5b, 5c . . . electrically connected in series and constituted in the following manner:

Plate area 6 is formed as a part of a layer of metallic coating applied to the lower side of the substratum. The coating is divided by a network of intersecting gaps or channels 7 electrically isolating local areas of the coating from each other. The local area or portion 6a is connected to a tubular conductive portion 8 constituted of a coating for the wall of the orifice 4a of the thermocouple in question. This coating of the orifice 4a thus establishes the electrical connection between the side faces 2 and 3 of the substratum 1. It is connected to a local area or plate 9 forming a part of a metallic coating layer applied on the upper surface of the substratum 1. The local areas 9 are isolated from one another by a network of intersecting channels 7 similar to the channels 7 at the lower side, but not in alignment therewith. Each thermocouple then includes in an annular zone surrounding the orifice 4b, a ring 10 made of metal forming a thermoelectric juncture with the metal of the local areas or plates 6 and 9. This ring 10 forms a part of a network of similar rings covering the layer of local areas or plates 9 and connected respectively to the second series of orifices 4b of the substratum 1. Each ring 10 is connected to a conductive portion 11 comprised of a metallic coating extending to the lower side 3 of the substratum 1 and being connected to a ring 12 surrounding the orifice 4b, and covering the portion 6b of a local area or plate of coating 6 adjacent to the plate 6 already described above.

It is noted that in the section in FIG. 2, the thickness of the metallic coatings are considerably exaggerated for clarity in the drawing.

It is seen that each thermocouple 5a, 5b, 5c, is connected by the intermediary of the local areas 6 and 9 and the coatings in the orifices 8 on one hand to the thermocouple which precedes it in the serial assembly of thermocouples and likewise to the thermocouple which follows it in this same assembly.

It is likewise seen that each thermocouple includes one hot juncture, comprised for example, of the ring 10 and the portion of the local area g situated beneath the said ring 10 and a cold juncture comprised of the ring 12 and the portion of the local area 6 situated beneath the said ring 12.

In a preferred embodiment of the invention, the areas 6 and 9 are formed of copper while the rings 10 and 12 as well as the conductive portion 11 are formed of nickel intended so that every thermo-electric couple formed by metals capable of being deposited by metallization techniques and having appropriate thermo-electric properties may be used. It is intended that the word metal also includes alloys.

In the embodiment illustrated, the local areas 6 and 9 are rectangular in shape, their length being twice their width. In addition, it is seen that each area 6, at either side of the substratum is located in overlapping relation with half of two local areas at the opposite side of the substratum, this placement being found to be the most advantageous for obtaining maximum density of the thermocouples per unit of surface of the sensor. It is noted that, moreover, the dimensions of the local areas have been exaggerated for clarity in the drawing, their sizes being much smaller than shown, which would further increase the density of the thermocouples.

The sensor or pickup shown in FIG. 1 has an input terminal 13 which is connected to an input plate area 14. This area serves for one of the thermocouples and comprises half of the area of any other plate area 9 or 6 provided for the other thermocouples. Likewise, the pickup contains an output terminal 15 connected to an output plate area 16 which is the other half of the plate area 9 or 6 already partially used for the input. The thermo-electrical voltage generated by the fluxmeter pickup illustrated in FIGS. 1 and 2 may thus be delivered to the terminals 13 and 15.

To fabricate this pickup the following procedure may be followed: first a rigid or pliable substratum 1 is prepared with two parallel sides. The material chosen for this substratum may be any material which is normally used in the technique for printed circuits. For example, if a fluxmeter having temperature capacity up to 120° C. is desired, preferably a fiber glass reinforced epoxy is used. If a temperature capacity up to 200° C. is desired, a glass material impregnated with polyimide resin may be used. This substratum is coated on both sides with a layer of a primary metal capable of forming one element of a thermoelectrical couple, such as copper, for example. Advantageously used at this stage may be a substratum already coated with copper on both sides; such substratums of various natures thus coated, exist on the market for the needs of the electronics industry.

Then a first series of orifices 4a is cut into the substratum, with a spacing which is twice the spacing of the network of orifices of the finished product. The assembly is then prepared for receiving a deposit of copper after which a copper plating is done by which the substratum is coated on both sides with a new layer of metal, this layer also coating the walls of the orifices 4a which are cut into the substratum.

A cutting of the second series of orifices 4b is then done in order to form the network as illustrated in FIGS. 1 and 2. A photo-sensitive resin is applied to both side faces of the assembly in a pattern providing shielding having openings corresponding to annular zones adjacent both ends of the orifices 4b, these zones to be used to form the rings 10 and 12.

After chemical preparation or cleaning of the assembly a nickel plating is applied which provides for formation of the rings 10 and 12 as well as coatings inside of the orifices 4b, the orifices 4a having been obturated by the shielding. The assembly is then cleaned in order to eliminate the shielding layer, after which a new photo-sensitive resin is applied in a pattern providing shielding according to the configuration of the channels 7 for isolating the plate areas on both sides of the substratum. The channels are then obtained by pickling (dipping). After elimination of the last shielding layer, the pickup as illustrated in FIGS. 1 and 2 is obtained.

Of course, the form describing the plate areas 6 and 9 is not limited. For example, it is possible to connect the corresponding orifices of the substratum 1 by plate areas in the form of bar bells or other appropriate forms which permit obtaining the same results as those with the arrangement illustrated in FIGS. 1 and 2.

Another variation of the pickup consists of coating the orifices 4a and 4b with different metals (gold and platinum, for example) and choosing for the layers for coating the sides 2 and 3 of the substratum 1 a third metal (such as copper). The coatings of the orifices are then connected to rings of the same metal as used for covering the inside surface of the respective orifices and deposited at the same time as the coatings for the orifices.

Figure 3:
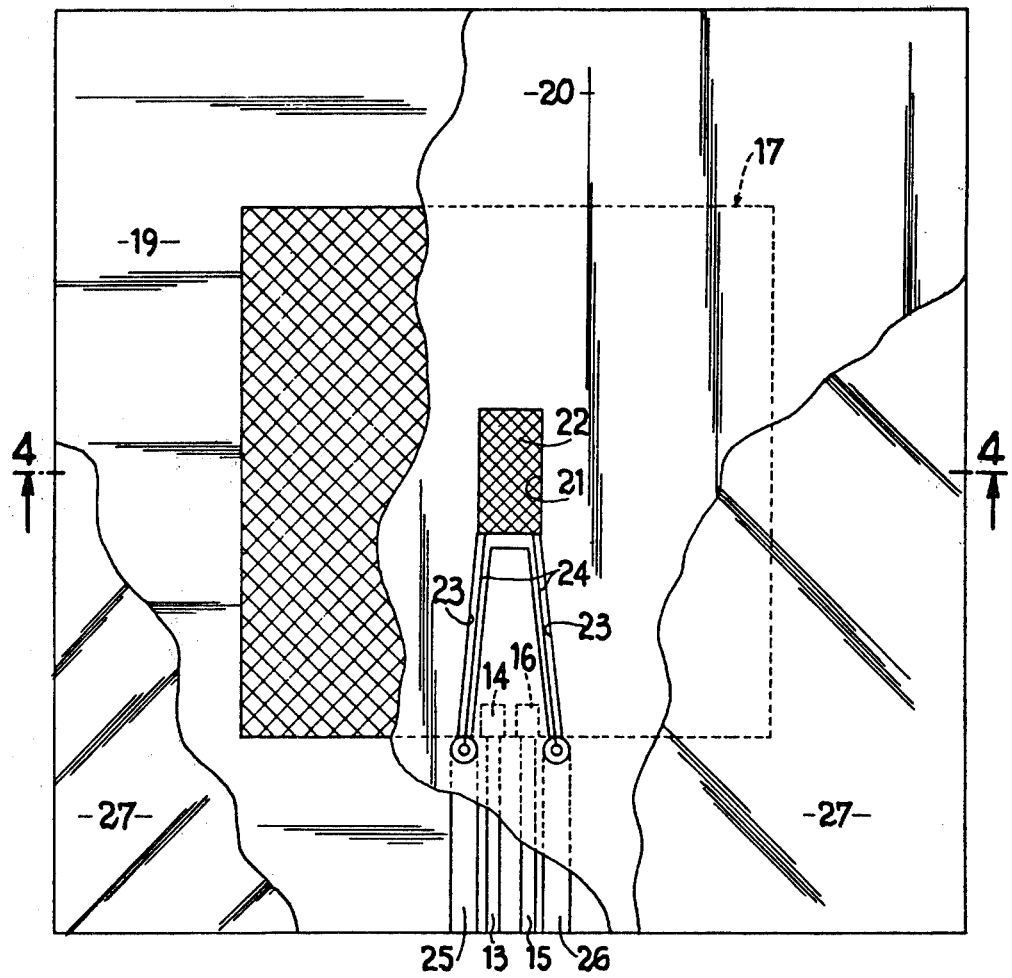
FIG. 3 shows a diagrammatic plan view, with portions broken out, of a fluxmeter according to the invention and containing the pickup illustrated in FIG. 1.

FIGS. 3 and 4 illustrate a mode of embodiment of the fluxmeter according to the invention. This mode includes a pickup 17 such as that illustrated in FIG. 1. It is intended that the number of thermocouples may be as large as desired, for example 1,250 for a pickup having the dimensions 250×250 mm.

The fluxmeter comprises a lower protective layer 18, for example of fiber glass reinforced epoxy and possibly having a thickness of about 0.15 mm. The pickup 17, placed in the center of the surface of this protective layer 18, is surrounded by a peripheral protective frame 19 preferably made of the same material as the substratum of the pickup, for example, also of fiber glass reinforced epoxy and having a thickness just about equal to that of the pickup 17, that is 2.4 mm, for example.

The frame 19 and the pickup 17 as well as covered with a plate 20, still of the same material, fiber glass reinforced epoxy for example, and having a thickness of about 2 mm. In the center of this plate 20 a housing 21 is arranged in which a temperature probe is placed, for example a probe having platinum resistance permitting the measurement of the temperature sensed by the fluxmeter. Grooves 23 make the housing 21 come in contact with the frame 19 and permit the connecting wires 24 of the probe 22 to be lodged. The probe 22 as well as the connecting wires 24 are coated with a protective resin. The side of the frame 19 adjacent to the terminal areas 14 and 16 of the pickup 17 is provided with four connecting conductors, two of which, 25 and 26, are connected to the wires 24 of the probe 22 and the other two of which form the terminals 13 and 15 of the pickup 17. The conductors 13, 15, 25 and 26 may be formed of copper ribbons adhered or fixed in some other way to the side corresponding to the side of the frame 19. These ribbons permit the joining of an external connector. Advantageously, in order to reduce the number of connections, a pickup support will be used having input plates 14 and output plates 16 aligned with an extension going to the edge of the protective frame 19, which frame will have an opening permitting the insertion of the extension. On this extension the conductors 13, 15, 25 and 26 will be embodied at the same time as the plates are formed. Thus the plates 14 and 16 are in electrical continuity with the conductors 13 and 15. The assembly which has just been described is covered with a layer 27 of fiber glass reinforced epoxy, for example, of a thickness of about 0.15 mm, protecting the fluxmeter which is assembled with the help of an epoxy resin adhesive. Polymerization of this adhesive may be effected at ambient temperature simultaneously with the assembly, the said assembly being done, for example, with the help of a hydraulic press with a pressure on the order of 1 to 2 bars. It is noted that during the assembly the epoxy resin adhesive fills the orifices 4a and 4b of the pickup 17.

Figure 6:
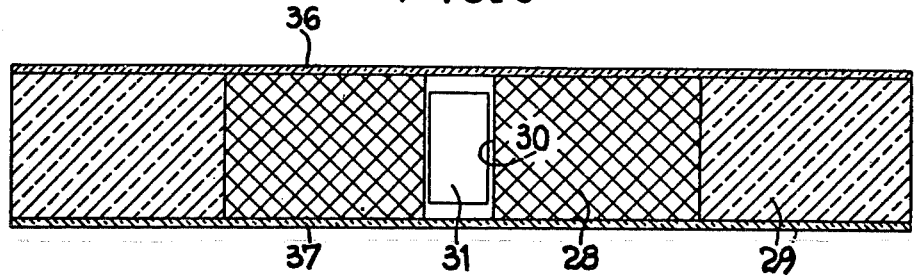
FIG. 6 is a transverse sectional view along the line 6—6 of FIG. 5.
Figure 5:
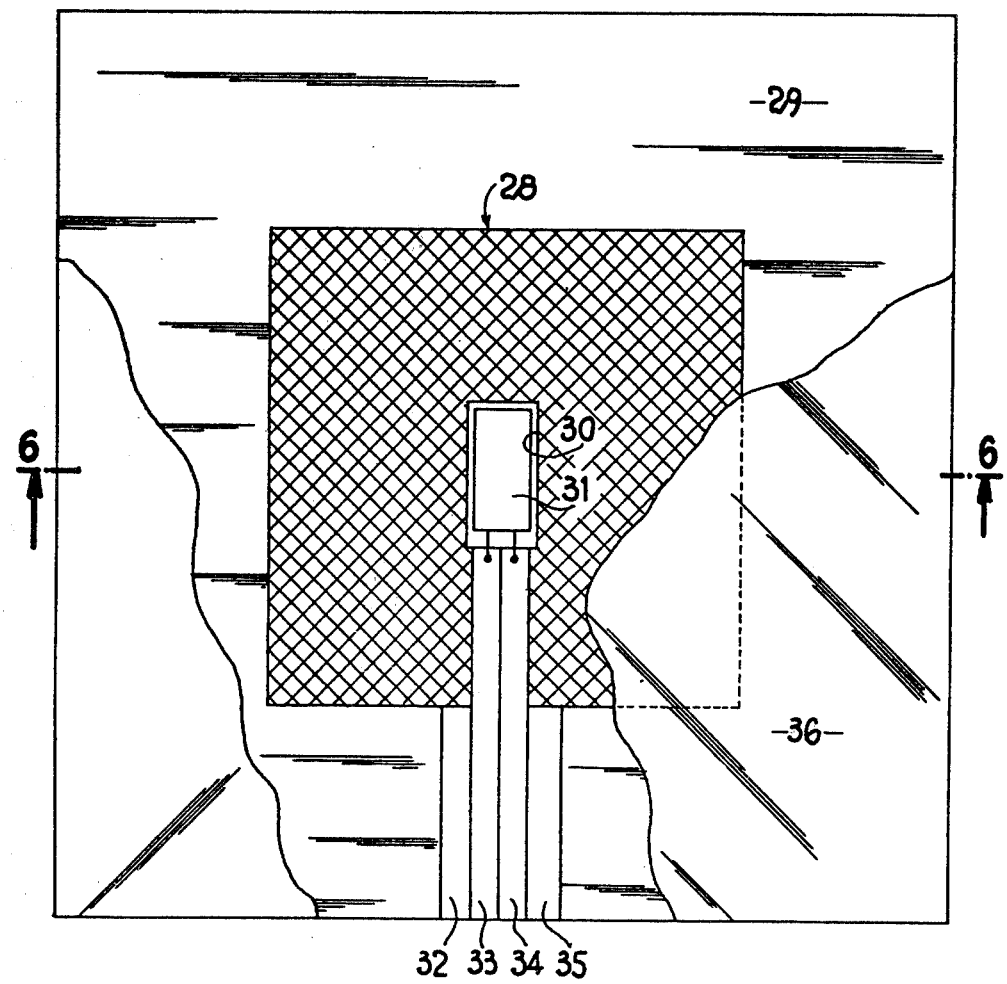
FIG. 5 is a plan view, similar to that of FIG. 3, and illustrating another embodiment of a fluxmeter according to the invention.

According to the alternative embodiment shown in FIGS. 5 and 6, the pickup 28, which, with respect to its conception may be essentially the same as the pickups of the preceding figures, is fitted in frame 29 formed preferably of fiber glass reinforced epoxy and having a thickness of about 2.4 mm. In this case a housing is arranged at the center of the pickup 28 itself. This housing shields a temperature probe 31, for example, having platinum resistance. The connections towards the exterior are effected by conducting bands 32 to 35 placed by way of any appropriate method on one of the sides of the frame 29 or on the extension of the substratum of the pickup 28 extending to the edge of the frame 29.

The fluxmeter likewise includes two protective layers 36 and 37 covering its two side faces and formed of fiber glass reinforced epoxy having a thickness of about 0.15 mm.

By again referring to FIGS. 1 and 2 it is seen that the thermocouples 5a, 5b, 5c . . . are arranged according to a given design which is here shown merely as an example in order to illustrate the possibilities of which the invention is capable. In other respects, FIGS. 1 and 2 only show one serial mounting of the thermocouples.

Figure 7:
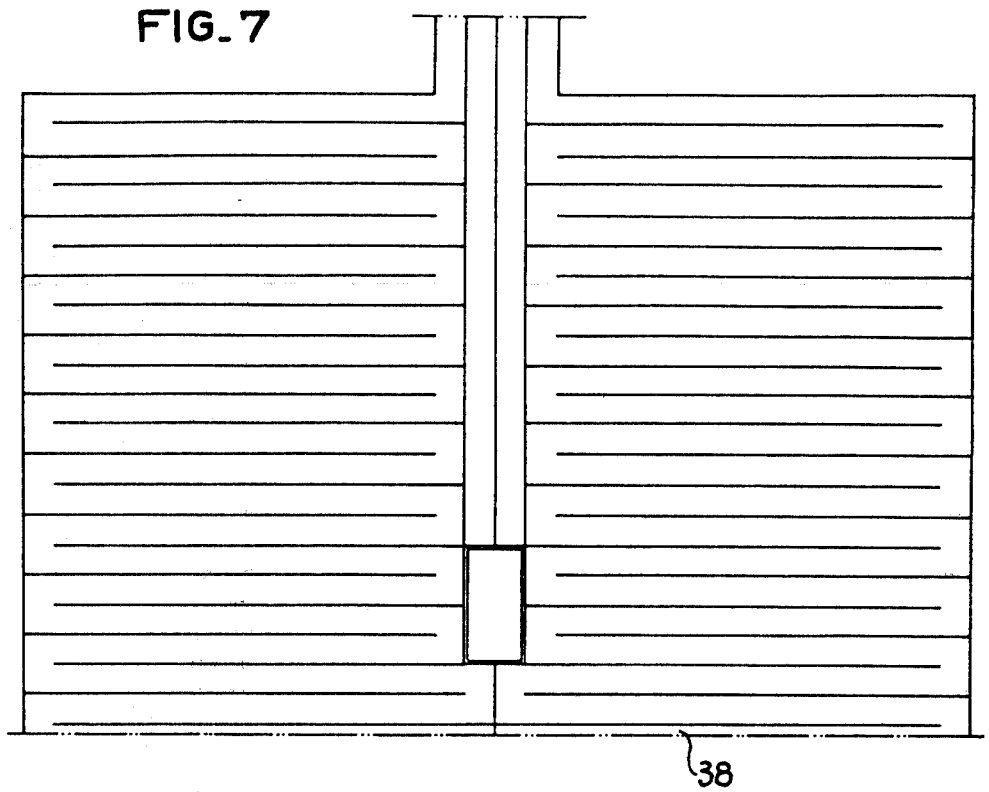
FIG. 7 is a diagrammatic view showing the pattern of possible alternative paths of the thermocouples in the fluxmeter.
Figure 8:
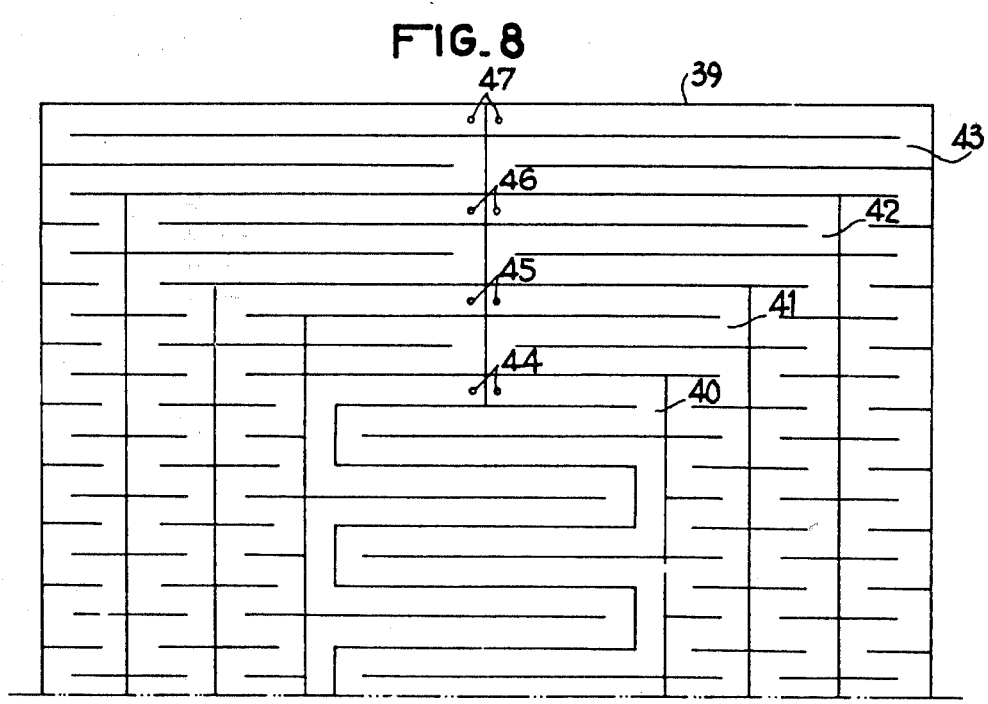
FIG. 8 shows another possible path of the thermocouples in the fluxmeter.

FIGS. 7 and 8 diagrammatically illustrate the flexibility which may be obtained with the invention. FIG. 7 shows a fluxmeter 38 with two boundaries, the assembly of thermocouples being mounted serially and their arrangement forming a zig-zag path in the substratum of the fluxmeter.

FIG. 8 diagrammatically shows still another embodiment of a fluxmeter 39 which includes several sensors 40, 41, 42 and 43 which are placed according to a concentric configuration and connected to the terminals 44 to 47 respectively. Such a fluxmeter is particuularly effective in determining the homogeneity of thermal flow through a given surface or area.

The examples herein disclosed show that with the technique of the invention for making fluxmeters by methods of metal depositing, it is possible, by changing only the shields used for the final stages of photoprinting, to obtain fluxmeters having various configurations for various applications.

This type of fluxmeter is used on the one hand for laboratory metrology and on the other hand for measuring in given situations elements in construction. In laboratory metrology, it will be used either as a thermal flux pickup, a zero pickup for assuring control of two isothermic planes by themselves and with respect to one another. In these two cases, the principle advantage of the fluxmeters according to the invention is the capability of using large pickups. In addition, their ruggedness makes possible measurements in given situations without any problems.

I claim:

1. A thermal fluxmeter comprising a pickup formed of a substratum of an electrical insulating material having a network of transverse orifices, several thermocouples serially connected and of which the hot and cold junctions are respectively positioned at opposite side faces of the substratum, the respective conductors of each thermocouple passing through orifices of the substratum to connect its hot and cold junctions to each other and to connect each thermocouple to the one which precedes it and to the one that follows it in the series, the fluxmeter being characterized in that the said conductors are formed by metallic coatings (6, 8, 9, 10, 11 and 12) placed respectively on opposite side faces (2, 3) of the substratum (1) and on the walls of the orifices (4a, 4b) in the substratum, the metallic coatings (6 and 9) at opposite side faces of the substratum being formed of the same metal; the conductors connecting each thermocouple (5a, 5b, 5c . . . ) to the one which follows it and to the one which precedes it in the series including an isolated plate area (6a) comprising a part of a coating covering a first side (3) of the substratum (1), a coating of a first orifice (4a) associated with this thermocouple being one of a pair of orifices in said series associated with this thermocouple, an isolated plate area (9) comprising a part of the coating covering the opposite side (2) of the substratum and extending beyond the other orifice (4b) associated with this thermocouple, as well as a portion of an isolated plate area (6b) comprising a part of the coating of the said first surface and surrounding said other orifice (4b); the coating of the two orifices (4a and 4b) associated with each thermocouple being formed of different metals.

2. A thermal fluxmeter comprising a pickup formed of a substratum of an electrical insulating material having a network of transverse orifices, several thermocouples serially connected and of which the hot and cold junctions are respectively positioned at opposite side faces of the substratum, the respective conductors of each thermocouple passing through orifices of the substratum to connect its hot and cold junctions to each other and to connect each thermocouple to the one which precedes it and to the one that follows it in the series, the fluxmeter being characterized in that the said conductors are formed by metallic coatings (6, 8, 9, 10, 11, 12) placed respectively on opposite side faces (2, 3) of the substratum (1) and on the walls of the orifices (4a, 4b) in the substratum; further characterized in that the conductors connecting each thermocouple (5a, 5b, 5c . . . ) to the one which follows it and to the one which precedes it in the series include an isolated plate area (6a) comprising a part of a coating covering a first side (3) of the substratum (1), a coating of a first orifice (4a) associated with this thermocouple and being one of a pair of orifices in said series associated with this thermocouple, an isolated plate area (9) comprising a part of the coating covering the opposite side (2) of the substratum and extending beyond the other orifice (4b) associated with this thermocouple, as well as a portion of an isolated plate area (6b) comprising a part of the coating of the said first surface and surrounding said other orifice (4b); and still further characterized in that each plate area (6 or 9) is rectangular having a length which is twice its width and equal to twice the spacing of the orifices (4a, 4b) of the said network.

3. A fluxmeter according to claim 2 characterized in that the conductors connecting the junctions of each thermocouple (5a, 5b, 5c . . . ) to one another comprise a coating (11) of the said other orifice (4b) of this thermocouple, two rings (10, 12) surrounding annular zones around this orifice (4b) on both sides of the said substratum (1) being connected electrically to this coating and covering respectively the coatings placed on the sides (2, 3) of the substratum (1).

4. A fluxmeter according to claim 3, characterized in that the coatings placed on the sides (2, 3) of the substratum (1) and the coatings placed on the walls of the orifices (4a) providing the connection between the thermocouples are formed of the same primary metal, while the coatings of the said other orifices (4b) as well as the said rings (10, 12) are formed of a second metal forming with the said primary metal a thermo-electric couple.

5. A fluxmeter according to claim 3, characterized in that the coatings of the two orifices (4a, 4b) belonging to each thermocouple (5a, 5b, 5c . . . ) are formed of different metals, and in that the coatings of the sides (2, 3) of the substratum (1) are formed of copper.

6. A fluxmeter according to either of claims 2 and 5, characterized in that any plate area (6) of one of the sides (2) of the substratum (1) overlaps half of a corresponding plate area (9) at the other side (3) of the substratum (1).

7. A fluxmeter according to claims 1 or 2, characterized in that it includes, in addition, a protective frame (20; 29) surrounding the said pickup (17; 28) as well as two protective layers (18, 27; 36, 37) on both sides of the assembly covering the respective sides of the pickup and of the frame.

8. A fluxmeter according to claim 7, characterized in that a housing (30) for a temperature probe (31) is arranged in the mid region of the said pickup (28).

9. A fluxmeter according to claim 7, characterized in that between the said pickup (17) and one of the said protective layers (27) a plate (20) is provided covering the pickup as well as the frame (19) which surrounds it, and in that a housing (21) is provided in the said plate (20) at a place coinciding with the center of the pickup, a temperature probe (22) being placed in said housing.

10. A fluxmeter according to claim 9, characterized in that the orifices (4a, 4b) of the said network are filled with a plastic material.

* * * * *

UNITED STATES PATENT AND TRADEMARK OFFICE
CERTIFICATE OF CORRECTION

PATENT NO. : 4,197,738
DATED : April 15, 1980
INVENTOR(S) : Michel Degenne

It is certified that error appears in the above-identified patent and that said Letters Patent are hereby corrected as shown below:

In the title page, change the Foreign Application Priority Data item [30] to read --Jan. 2, 1978 [FR] France .................... 78 00009--.

Col. 2, line 15, - after "(electroplating" but before the "," insert --[galvanizing]--.

Col. 3, line 48, - "g" should be --9--.

Signed and Sealed this

Fifteenth Day of July 1980

[SEAL]

Attest:

SIDNEY A. DIAMOND

Attesting Officer

Commissioner of Patents and Trademarks